United States Patent
Klimczak et al.

(10) Patent No.: US 12,076,921 B2
(45) Date of Patent: Sep. 3, 2024

(54) 3D PRINTING LIQUEFIER NOZZLE FLEXURE FOR IMPROVED IRONING

(71) Applicant: JABIL INC., St. Petersburg, FL (US)

(72) Inventors: Scott Klimczak, St. Petersburg, FL (US); Luke Rodgers, St. Petersburg, FL (US); Darin Burgess, St. Petersburg, FL (US)

(73) Assignee: JABIL INC.

( * ) Notice: Subject to any disclaimer, the term of this patent is extended or adjusted under 35 U.S.C. 154(b) by 472 days.

(21) Appl. No.: 17/417,043

(22) PCT Filed: Dec. 19, 2019

(86) PCT No.: PCT/US2019/067334
§ 371 (c)(1),
(2) Date: Jun. 21, 2021

(87) PCT Pub. No.: WO2020/132167
PCT Pub. Date: Jun. 25, 2020

(65) Prior Publication Data
US 2022/0072776 A1    Mar. 10, 2022

Related U.S. Application Data

(60) Provisional application No. 62/782,065, filed on Dec. 19, 2018.

(51) Int. Cl.
*B29C 67/00*     (2017.01)
*B29C 64/209*    (2017.01)
*B29C 64/236*    (2017.01)
*B33Y 30/00*     (2015.01)

(52) U.S. Cl.
CPC .......... *B29C 64/209* (2017.08); *B29C 64/236* (2017.08); *B33Y 30/00* (2014.12)

(58) Field of Classification Search
CPC ... B29C 64/118; B29C 64/209; B29C 64/218; B29C 64/227; B29C 64/386; B29C 64/393
See application file for complete search history.

(56) References Cited

U.S. PATENT DOCUMENTS

| 9,278,474 B1 | 3/2016 | Chang |
| 2011/0074065 A1 | 3/2011 | Batchelder |

(Continued)

FOREIGN PATENT DOCUMENTS

| CN | 104842559 | 8/2015 |
| CN | 105291435 | 2/2016 |

(Continued)

OTHER PUBLICATIONS

International Search Report, dated Jun. 25, 2020 for PCT/US2019/067334.

(Continued)

*Primary Examiner* — Thu Khanh T. Nguyen
(74) *Attorney, Agent, or Firm* — Riverside Law LLP (57) ABSTRACT

An apparatus, system and method for providing a liquefier nozzle flexure to at least enable ironing of a 3D print, to thereby improve print quality. The apparatus, system and method may include: a controllable print head for providing the 3D print; a liquefier capable of liquefying deposit material for providing the 3D print; and the liquefier nozzle flexure mounted between the print head and the liquefier that allows a distance between the print head and the liquefier to vary when a resistance is encountered at a print nozzle tip.

21 Claims, 9 Drawing Sheets

(56) References Cited

U.S. PATENT DOCUMENTS

| | | | |
|---|---|---|---|
| 2012/0156319 A1* | 6/2012 | Hehl | B29C 64/112 |
| | | | 425/375 |
| 2012/0162314 A1 | 6/2012 | Swanson et al. | |
| 2013/0234366 A1 | 9/2013 | Batchelder et al. | |
| 2014/0048970 A1 | 2/2014 | Batchelder et al. | |
| 2014/0361460 A1 | 12/2014 | Mark | |
| 2016/0136888 A1 | 5/2016 | Bayley | |
| 2016/0368213 A1 | 12/2016 | Mark | |
| 2017/0157826 A1 | 6/2017 | Hishiki | |
| 2017/0312987 A1 | 11/2017 | Ladanyi | |
| 2018/0056602 A1 | 3/2018 | Susnjara | |
| 2019/0118252 A1* | 4/2019 | Bauer | B33Y 10/00 |
| 2020/0298478 A1* | 9/2020 | MacNeish, III | B33Y 30/00 |

FOREIGN PATENT DOCUMENTS

| | | |
|---|---|---|
| CN | 105383060 | 3/2016 |
| CN | 105711093 | 6/2016 |
| CN | 205364544 | 7/2016 |
| CN | 105922593 | 9/2016 |
| CN | 106799833 | 6/2017 |
| CN | 106827536 | 6/2017 |
| CN | 108189396 | 6/2018 |
| JP | 2018114652 | 7/2018 |

OTHER PUBLICATIONS

Written Opinion of the International Searching Authority, dated Jun. 25, 2020 for PCT/US2019/067334.

\* cited by examiner

3D PRINTING LIQUEFIER NOZZLE FLEXURE FOR IMPROVED IRONING

CROSS-REFERENCE TO RELATED APPLICATIONS

The present application claims benefit to International Application PCT/US2019/067334, filed Dec. 19, 2019, entitled: "3D Printing Liquefier Nozzle Flexure for Improved Ironing," which claims priority to U.S. Provisional Application No. 62/782,065, filed Dec. 19, 2018, entitled: "3D Printing Liquefier Nozzle Flexure for Improved Ironing," the entirety of which is incorporated herein by reference as if set forth in its entirety.

BACKGROUND

Field of the Disclosure

The present disclosure relates to additive manufacturing, and, more specifically, to an apparatus, system and method of providing a 3D printing liquefier nozzle flexure for improved ironing and print quality.

Description of the Background 3D printing is a type of additive manufacturing. As opposed to subtractive manufacturing, where material is removed from a starting mass of material, additive manufacturing incrementally adds material to form an object. Additive manufacturing has many benefits and the additive manufacturing industry is growing as the technology is applied to new fields and end products.

Fused filament fabrication (FFF) is a type of additive manufacturing that utilizes filament as a starting material. The filament is typically thermoplastic, meaning that the filament is solid at ambient temperature and becomes liquefied or partially liquefied when heated to a specific temperature. FFF printers take advantage of this characteristic to sequentially deposit liquefied or partially liquefied filament in specific locations on a build plate or on a partially printed object. Upon cooling, the newly deposited filament solidifies and is part of the printed object.

FFF printers deposit material with a print head that can move in the X, Y, and Z directions. The print head typically prints a first base layer in the X and Y directions. The print head then moves up in the Z direction and prints a second layer. This process continues until a 3D printed part is complete, as dictated by print plan software. Scaffolding may be printed to support the 3D printed part, such as at areas where the part overhangs and is not supported by material underneath it. The use of scaffolding prevents overhang material from breaking off of the printed object during the 3D print.

FFF printers deposit the liquefied or partially liquefied filament in the form of a bead. To achieve optimum print quality, it is important to have a consistent filament bead deposition rate throughout the 3D print. Having a filament deposition rate that varies can undesirably lead to more filament in one section of the print and less filament in another.

FFF printing has been very successful for low speed, low throughput applications. To utilize FFF for high volume production, print speed needs to be increased. When increasing print speed, several challenges must be addressed. One of the challenges that needs to be addressed is uniform filament deposition at high print speeds. For example, when printing at high print speeds, there is a tendency for material to be deposited unevenly during fill movements.

Fill movements involve the print head moving back and forth, typically within a previously deposited perimeter of material, to fill in the center portion of a 3D printed part. When performing a fill movement, a print head deposits material in one direction and then undergoes a 180 degree turn before depositing material in an opposite direction. When performing a fill move at a high speed, non-flexing print heads tend to leave extra material at the location of the 180 degree turn. Further, non-flexing print heads tend to leave undesirable ridges which are formed as melted filament is deposited. Introducing an "ironing" effect during printing can alleviate both of the aforementioned issues.

Therefore, there is a need for an apparatus, system and method of providing a 3D printing liquefier nozzle flexure for improved ironing and print quality.

SUMMARY

The disclosure is of and includes at least an apparatus, system and method of providing a 3D printing liquefier nozzle flexure for improved ironing and print quality. The apparatus, system and method may include a flexure that allows a liquefier to move in relation to a print head. For example, a flexure may be mounted between a print head and a liquefier so that the distance between the print head and the liquefier is allowed to vary when a resistance is encountered at a nozzle tip. The resistance may be caused by the nozzle tip contacting excess deposited material or by a collision of the nozzle tip with an imperfection in a 3D printed object.

Thus, the disclosed embodiments provide an apparatus, system and method of providing a 3D printing liquefier nozzle flexure for improved ironing and print quality.

BRIEF DESCRIPTION OF THE DRAWINGS

The disclosed non-limiting embodiments are discussed in relation to the drawings appended hereto and forming part hereof, wherein like numerals indicate like elements, and in which.

DETAILED DESCRIPTION

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. That is, terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the exemplary embodiments.

Processor-implemented modules and print systems are disclosed herein that may provide access to and transformation of a plurality of types of digital content, including but not limited to print plans and data streams, and the algorithms applied herein may track, deliver, manipulate, transform, transceive and report the accessed content. Described embodiments of these modules, apps, systems and methods are intended to be exemplary and not limiting.

An exemplary computing processing system for use in association with the embodiments, by way of non-limiting example, is capable of executing software, such as an operating system (OS), applications/apps, user interfaces, and/or one or more other computing algorithms, such as the print recipes, algorithms, decisions, models, programs and subprograms discussed herein. The operation of the exemplary processing system is controlled primarily by non-transitory computer readable instructions/code, such as instructions stored in a computer readable storage medium, such as hard disk drive (HDD), optical disk, solid state drive, or the like. Such instructions may be executed within the central processing unit (CPU) to cause the system to perform the disclosed operations. In many known computer servers, workstations, mobile devices, personal computers, and the like, CPU is implemented in an integrated circuit called a processor.

It is appreciated that, although the exemplary processing system may comprise a single CPU, such description is merely illustrative, as the processing system may comprise a plurality of CPUs. As such, the disclosed system may exploit the resources of remote CPUs through a communications network or some other data communications means.

In operation, CPU fetches, decodes, and executes instructions from a computer readable storage medium. Such instructions may be included in software. Information, such as computer instructions and other computer readable data, is transferred between components of the system via the system's main data-transfer path.

In addition, the processing system may contain a peripheral communications controller and bus, which is responsible for communicating instructions from CPU to, and/or receiving data from, peripherals, such as 3D printers and/or the operator interaction elements to formulate a print, as discussed herein throughout. An example of a peripheral bus is the Peripheral Component Interconnect (PCI) bus that is well known in the pertinent art.

An operator display/graphical user interface (GUI) may be used to display visual output and/or presentation data generated by or at the request of processing system, such as responsive to operation of the aforementioned computing programs/applications. Such visual output may include text, graphics, animated graphics, and/or video, for example.

Further, the processing system may contain a network adapter which may be used to couple to an external communication network, which may include or provide access to the Internet, an intranet, an extranet, or the like. Communications network may provide access for processing system with means of communicating and transferring software and information electronically. Network adaptor may communicate to and from the network using any available wired or wireless technologies. Such technologies may include, by way of non-limiting example, cellular, Wi-Fi, Bluetooth, infrared, or the like.

Figure 1:
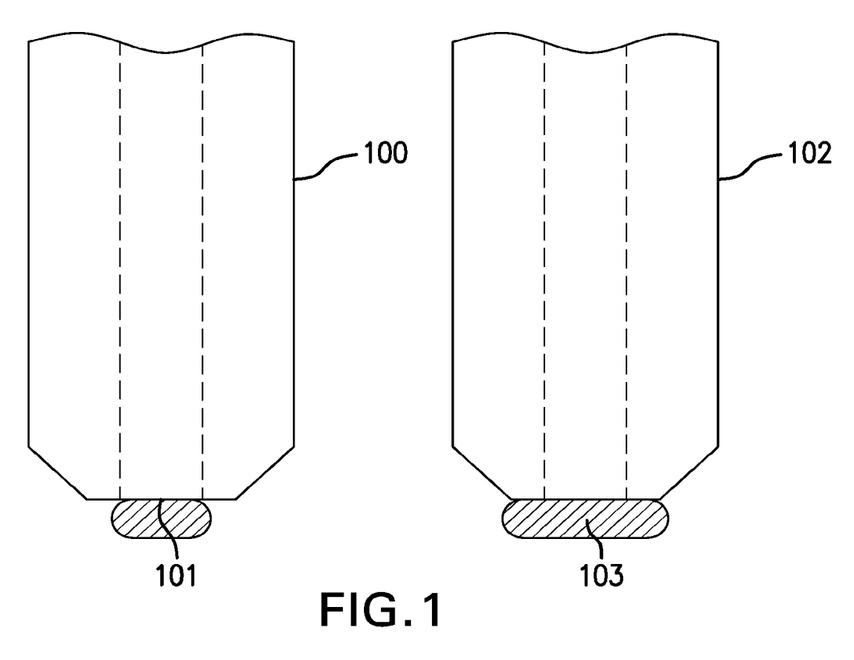
FIG. 1 is an illustration of a non-ironed filament bead and an ironed filament bead.

FIG. 1 illustrates the effect of "ironing." When producing a 3D printed object by fused filament fabrication, liquefied or partially liquefied filament may exit a nozzle 100 without an ironing effect at nozzle tip 101. In the absence of ironing, the nozzle produces a bead 101 that has a small width. Nozzle 102 illustrates what the bead width would look like if the volume of material extruded was more than the nozzle inner diameter (ID) and the layer height 105. The additional material is extruded out and ironed into a wide flat bead. If excess material is fed, the material will flatten out as illustrated in 103. If the nozzle is rigid, the distance 105 remains the same. With the flexure design, the dimension at 105 is allowed to flex up, giving room for the material to dispense into and time for the dispensed material to flow flat under the force of the flexure.

Figure 2:
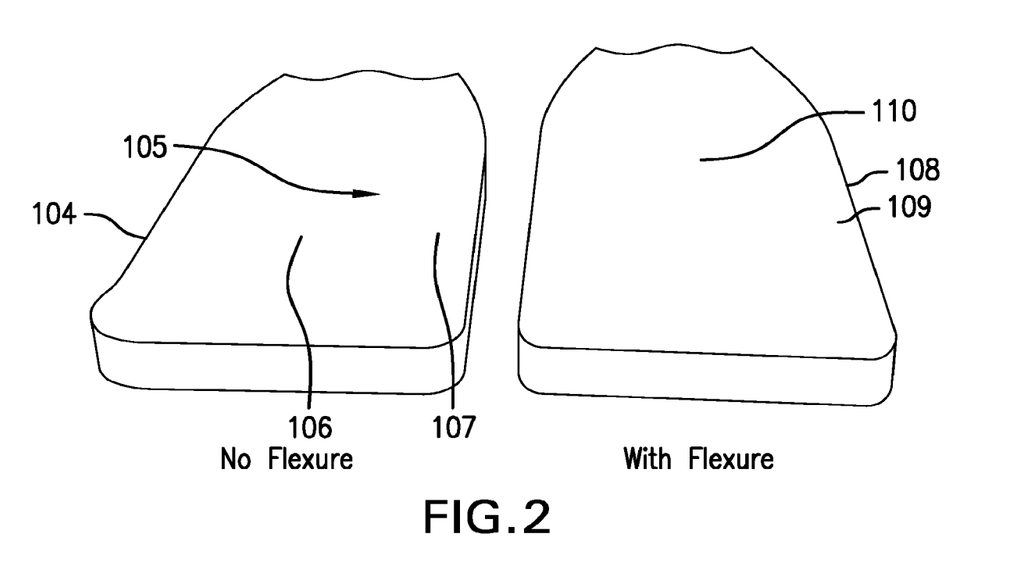
FIG. 2 is an illustration of improved print quality when printing with a nozzle flexure, compared to print quality when printing without a nozzle flexure.

At high print speeds, for example at 160 mm/sec, there is a visually observable difference in part appearance when printing with and without a flexure. FIG. 2 shows that the part 104 that was printing without a flexure has more noticeable ridges 105 and also has a noticeable lack of material in the center 106 of the part 104. Without a flexure, the extra material from a very quick 180-degree move was left at the turn around points 107. In contrast, the part 108 that was printed with a flexure installed is much flatter at the 180 degree turn around points 109. Further, more material was deposited in the middle 110 of the part, as evidenced by the fact that there was more ironing in the middle 110 of the part 108.

Figure 3:
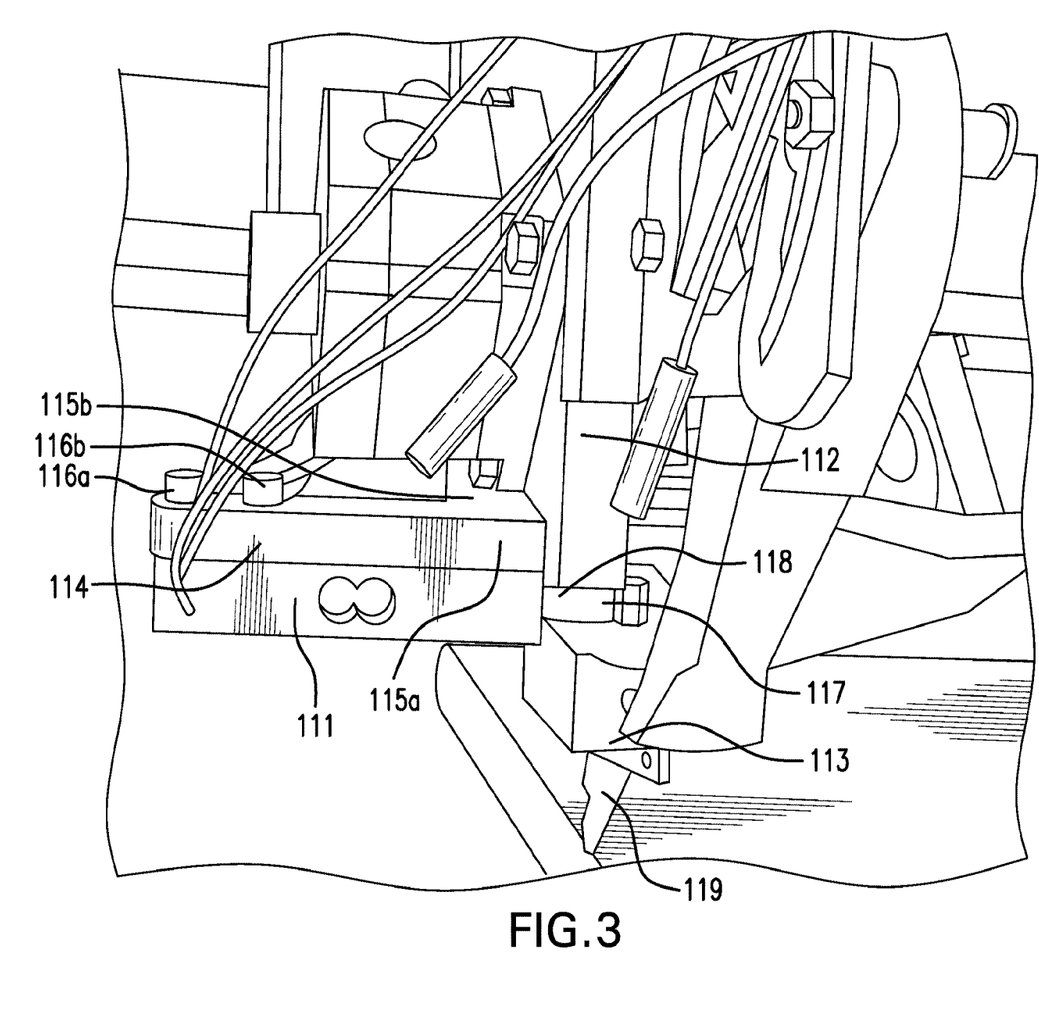
FIG. 3 is an illustration of a nozzle flexure installed between a 3D printer print head and a liquefier.

FIG. 3 shows a nozzle flexure 111 installed between a 3D printer print head 112 and a liquefier 113. The nozzle flexure 111 may be a load cell or it may be any other flexible material known to the skilled artisan.

As shown in FIG. 3, a flexure mount 114 may be mounted to the print head 112. Flexure mount 114 may be connected to print head 112, for example by connections 115a and 115b. A flexure 111 may be connected to the flexure mount 114 by one or more connections. For example, a flexure 111 may be connected to the flexure mount 114 by flexure mount connections 116a and 116b on a second side thereof which is distal to the liquefier 113.

A liquefier mount 117 may be connected to the flexure 111 at liquefier mount connection 118 on a first side of flexure 111. A liquefier 113 may be connected to the liquefier mount 117 via the liquefier mount connection 118 extending from a first side of flexure 111, which is proximal to the liquefier 113. The liquefier 113 may be connected to a nozzle 119. The nozzle 119 may move further away from and closer to the print head 112 when the nozzle 119 encounters resistance or lack thereof. For example, the resistance may be caused by the nozzle tip contacting excess deposited material or by a collision of the nozzle tip with an imperfection in a 3D printed object. The flexure 111 may pivot at the flexure mount connections 116a and 116b mounted through the flexure mount 114 to flexure 111 on the top side of flexure 111 as shown in FIG. 3.

Figure 4:
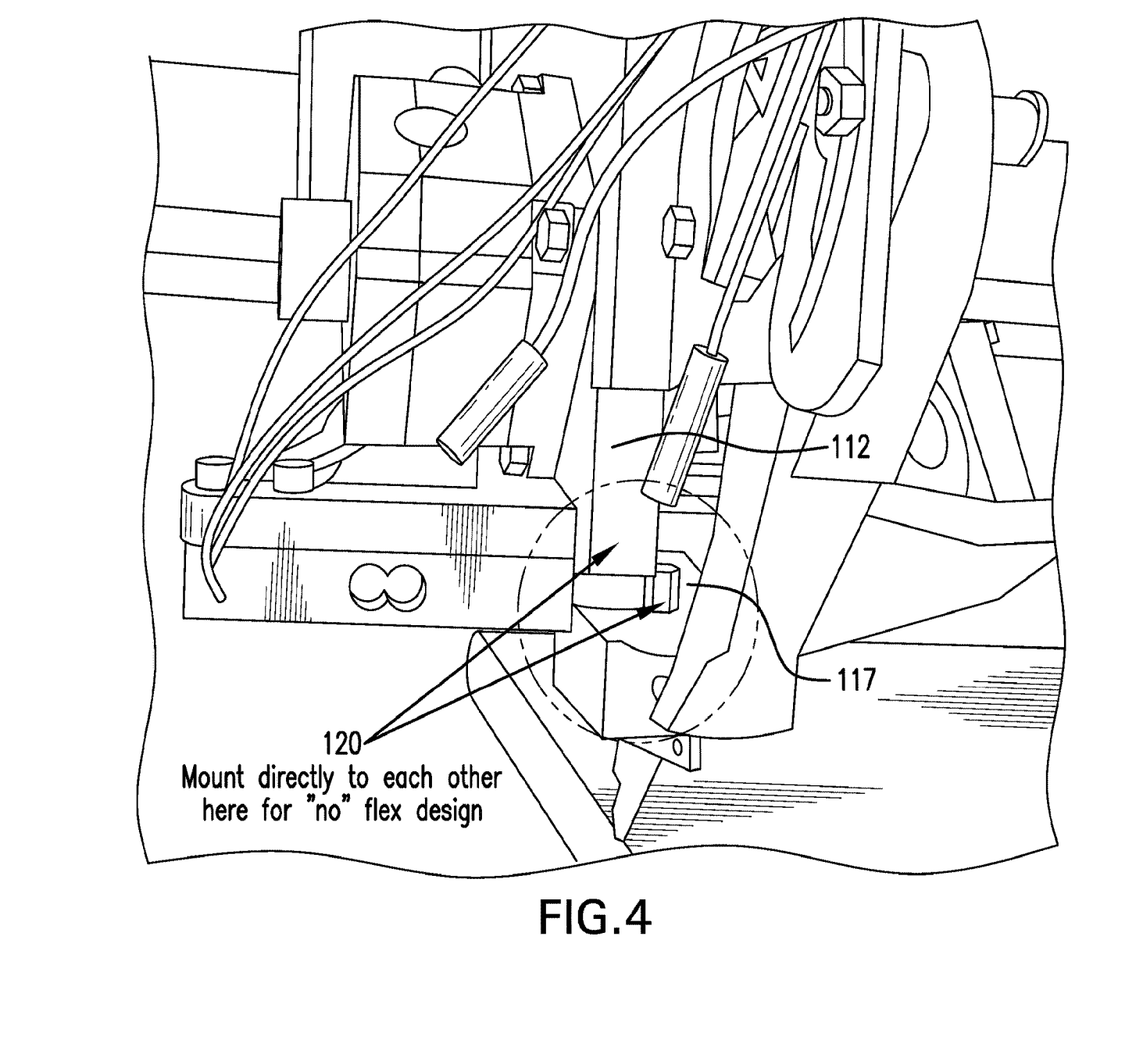
FIG. 4 is an illustration of a nozzle configured for a no flex design.

The nozzle 119 may be set at a fixed distance from the print head 112 by fastening the nozzle mount 117 to the print head 112 with a rigid connection at location 120. This configuration is shown in FIG. 4.

Figure 5:
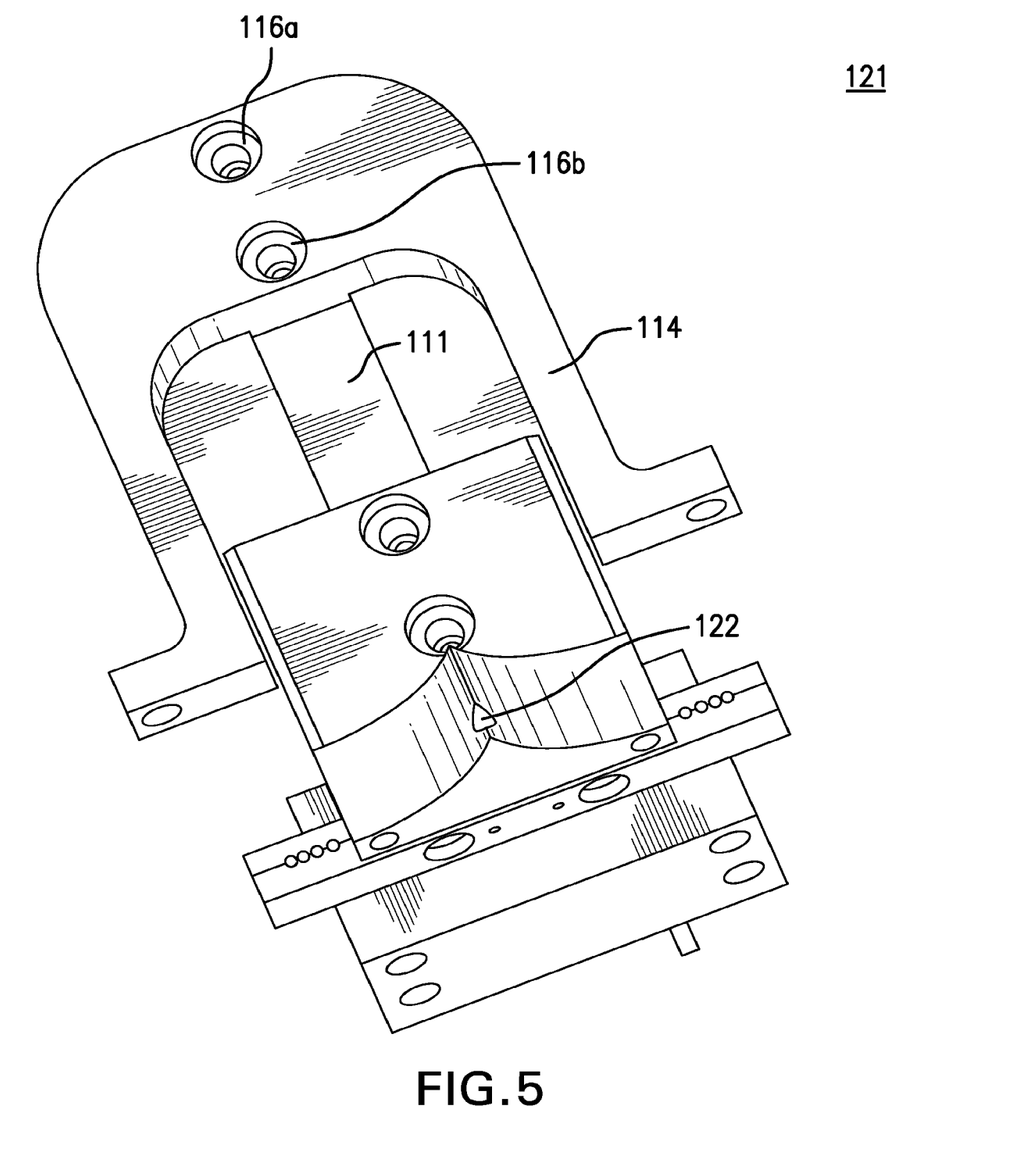
FIG. 5 is an illustration of an overhead view of the flexure assembly.

FIG. 5 shows an overhead view of the flexure assembly 121. As shown in FIG. 5, flexure mount 114 may be connected to flexure 111 by flexure mount connections 116a and 116b. Filament may be fed through filament feed opening 122. It is apparent from FIG. 5 that flexure 111 is only connected to flexure mount 114 at flexure mount connections 116a and/or 116b. Therefore, the liquefier 113 and the nozzle 119 are allowed to float up and down relative to the print head 112 during a print. For example, nozzle 110 may float up (towards the print head 112) when a resistance is encountered at a nozzle tip. The resistance may be caused by the nozzle tip contacting excess deposited material or by a collision of the nozzle tip with an imperfection in a 3D printed object. The ability for the nozzle 100 to float upward upon encountering an imperfection in a 3D printed object may prevent the nozzle 100 from breaking the 3D printed object.

Figure 6:
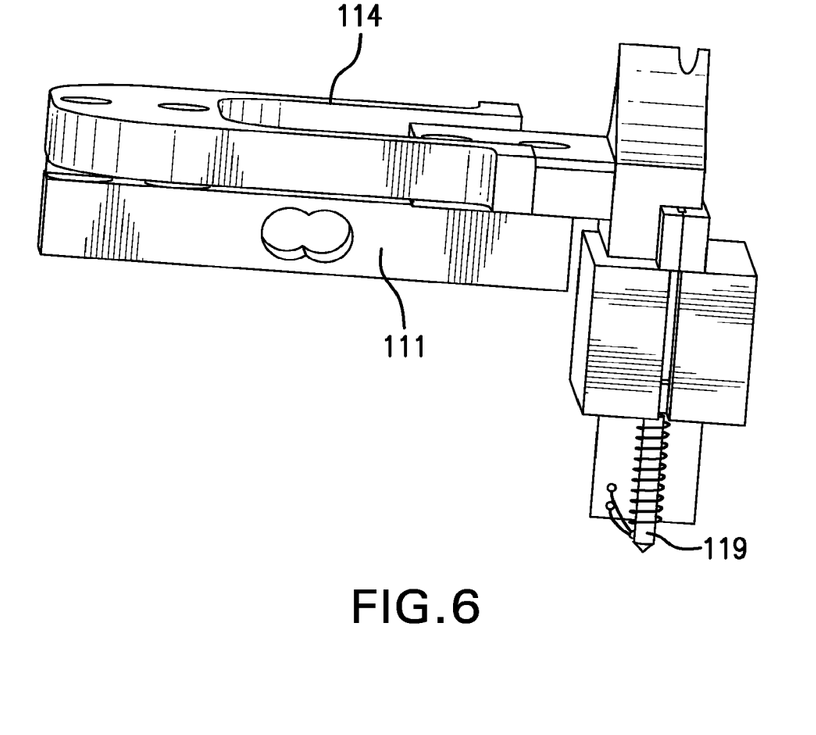
FIG. 6 is an illustration of a side view of the flexure assembly.

FIG. 6 shows a side view of an embodiment where the flexure 111 is a load cell that is connected to a flexure mount 114. A heated nozzle 119 may also be included.

Figure 7:
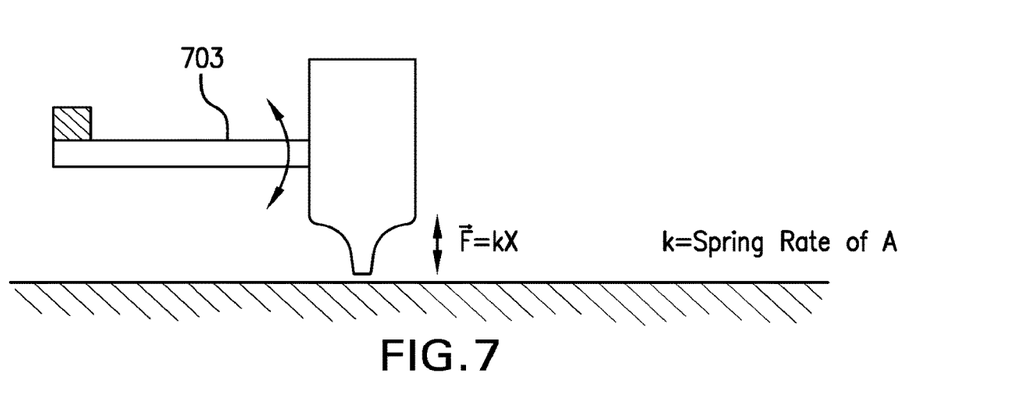
FIG. 7 illustrates aspects of the disclosed embodiments.

The embodiments thus include the integration of a flexure between the liquefier and the hard mount of the print head to the X-Y motion. Design variations may include a flexure that is always in play; a flexure that may be turned on and off; and a flexure that may be subjected to a change in the rate of flex via a computer control system program executing a print plan or aspects thereof, therefore allowing a different flex amount depending on the process details at the head during the print. For example, FIG. 7 shows a flexure that may be able to flex by pivoting at the left side of the flexure 703. The flexure may be turned off by pinning the flexure to a stationary, non-flexing part of the print head. The flexure may be turned off manually or automatically. The flexure may be turned on or off prior to a print or during a print.

Figure 8:
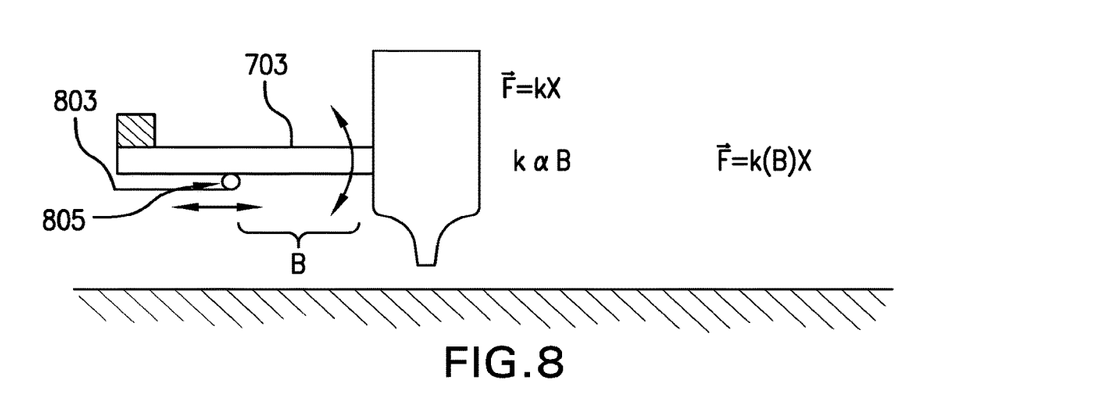
FIG. 8 illustrates aspects of the disclosed embodiments.

For example, FIG. 8 shows an actuator 803 that may move a roller 805 to adjust a distance (B) between the roller and the liquefier. By adjusting the distance (B), the stiffness of the flexure is adjusted. For example, decreasing the distance (B) results in a stiffer flexure. The distance (B) may be adjusted before a print or during a print and the actuator that moves the roller may be automated. The automated actuator may vary the flexure's stiffness during a print.

Figure 9:
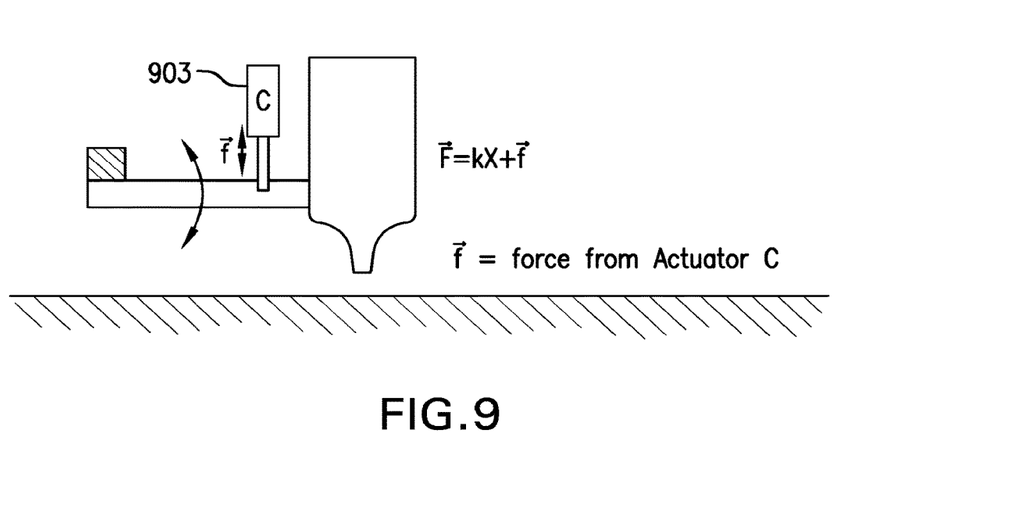
FIG. 9 illustrates aspects of the disclosed embodiments.

FIG. 9 shows an actuator 903 that may be used to adjust the flexure's stiffness. The actuator may be pneumatic and vary air pressure to change/vary the downward force applied to the flexure. When using a pneumatic actuator, the force is related to air pressure. The actuator may utilize a servo-mechanism or servomotor to vary the force applied to the flexure, thereby varying the flexure's stiffness. When using a servomechanism or servomotor, the force is controlled by the servomechanism or servomotor. The servomechanism or servomotor may be a linear servomechanism. The actuator may utilize a piezoelectric actuator to apply a variable force to the flexure, thereby varying the flexure's stiffness. When using a piezoelectric actuator, voltage is used to expand the size of the piezoelectric actuator, thereby changing the force applied to the flexure and changing the flexure's stiffness.

A key value for the flexure is during any speed up and slow down of the X-Y motion. As the print speeds up and slows down, the volume of material that is extruded from the nozzle will be more than needed for a perfect bead on the slow down and less than needed when the print head speeds up. Any rapid change in speed will gain advantage from the disclosed embodiments.

Figure 10:
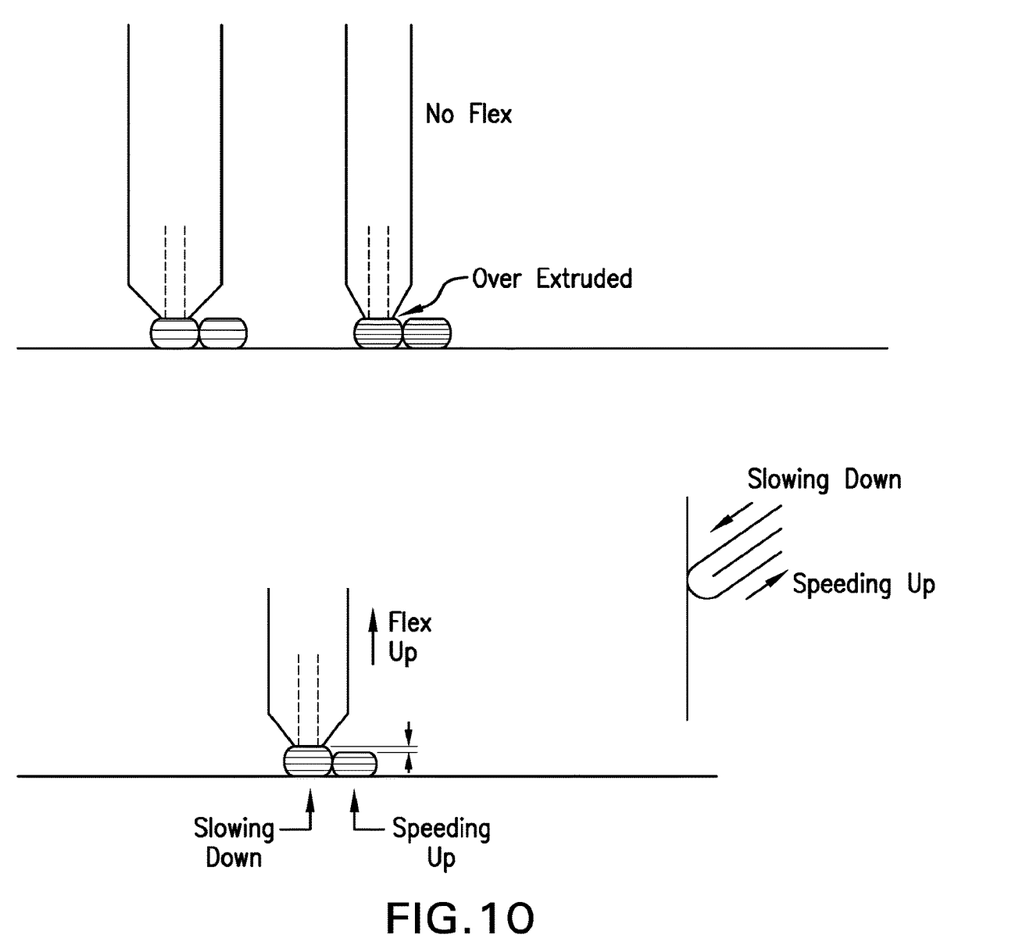
FIG. 10 illustrates aspects of the disclosed embodiments.
Figure 11:
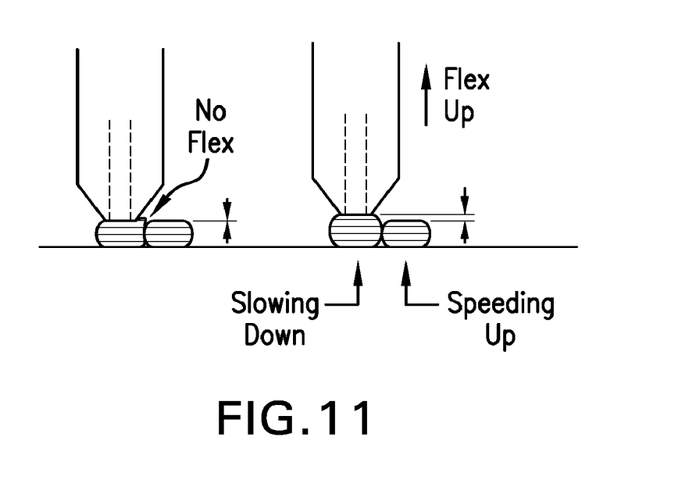
FIG. 11 illustrates aspects of the disclosed embodiments.

As the X-Y slows down for a turn, the extruder cannot slow down the material flow fast enough and the system over extrudes, produces more material than is required for the bead width. Without the flexure, the Z height of the nozzle tip stays the same and the material flows around it. If there is a bead next to it, the material will flow up in the Z direction, around the nozzle, creating sharp features along the path of the bead. This is shown in FIGS. 10 and 11.

As illustrated, the flexure allows the nozzle to move up in the Z direction, allowing the material to stay under the nozzle and allows it to be ironed cleanly. The result is a bead height that is a little taller, but the material is not forced to the side of the nozzle. So, the ultimate print is a lot smoother on top.

In the foregoing Detailed Description, it can be seen that various features are grouped together in a single embodiment for the purpose of clarity and brevity of the disclosure. This method of disclosure is not to be interpreted as reflecting an intention that the embodiments require more features than are expressly recited herein. Rather, the disclosure is to encompass all variations and modifications to the disclosed embodiments that would be understood to the skilled artisan in light of the disclosure.

What is claimed is:

1. A system for providing a liquefier nozzle flexure to at least enable ironing of a 3D print, comprising:
a controllable print head for providing the 3D print;
a liquefier capable of liquefying deposit material for providing the 3D print;
the liquefier nozzle flexure having a first side proximal to the liquefier, a second side distal to the liquefier, and a top side mounted to the controllable print head only proximate to the second side of the liquefier nozzle flexure; and
a liquefier mount connection that operatively connects the liquefier nozzle flexure to the liquefier, the liquefier nozzle flexure extending solely from the first side of the liquefier nozzle flexure to a far side of the liquefier such that a distance between the controllable print head and the liquefier is allowed by the liquefier nozzle flexure to vary when a resistance is encountered at a print nozzle tip.

2. The system of claim 1, wherein the resistance comprises contacting excess of the deposited material.

3. The system of claim 1, wherein the resistance comprises collision of the print nozzle tip with an imperfection in the 3D print.

4. The system of claim 1, wherein the flexing allows for the dispensed material to flow flat under force from the flexure.

5. The system of claim 1, wherein the flexure comprises a load cell.

6. The system of claim 1, wherein the flexure comprises a flexure mount fastened to the controllable print head via the top side of the flexure.

7. The system of claim 6, wherein the flexure pivots at the flexure mount.

8. The system of claim 7, wherein the pivoting flexure enables the liquefier to float up and down relative to the controllable print head.

9. The system of claim 1, wherein the print nozzle is heated.

10. The system of claim 1, wherein the controllable print head further comprises a hard mount of the print head to an X-Y axis motion control, and wherein the flexure is between the liquefier and the hard mount of the controllable print head to the X-Y motion control.

11. The system of claim 1, wherein the flexure may be turned on and off.

12. The system of claim 11, wherein the turn off comprises a pinning of the flexure to the controllable print head.

13. The system of claim 11, wherein the turn on is automated.

14. The system of claim 1, further comprising an actuator configured to apply a variable force to the flexure.

15. The system of claim 14, wherein the actuator comprises a roller.

16. The system of claim 14, wherein the actuator is pneumatic.

17. The system of claim 14, wherein the actuator comprises a servomotor.

18. The system of claim 14, wherein the actuator comprises a piezoelectric.

19. The system of claim 1, wherein the flexure is not a load cell.

20. A system for printing a filament, comprising:
a print head;
a flexure mount connected to the print head;
a flexure comprising a flexible material, the flexure connected to the print head, wherein the flexure is positioned below the flexure mount and configured to pivot relative to the flexure mount;
a liquefier connected to the flexure, such that at least a portion of the flexure is between the print head and the liquefier; and
a print nozzle connected to the liquefier.

21. A system for printing a filament, comprising:
a print head;
a liquefier;
a flexure comprising a flexible material associated with a stiffness, the flexure operatively connecting the print head to the liquefier;
an actuator capable of adjusting the stiffness of the flexure; and
a print nozzle connected to the liquefier.

* * * * *